→| |←10μ

United States Patent Office 3,647,773
Patented Mar. 7, 1972

3,647,773
SUSPENSION POLYMERIZATION IN THE PRESENCE OF α-METHYL STYRENE
Keitaro Ohe, Daijiro Nishio, and Shigeru Sadamatsu, Isaida Odawara-shi, Japan, assignors to Fuji Photo Film Co., Ltd., Kanagawa, Japan
Filed Jan. 22, 1969, Ser. No. 793,062
Claims priority, application Japan, Jan. 22, 1968, 43/3,589
Int. Cl. C08f 3/64, 3/30, 7/04
U.S. Cl. 260—88.7
8 Claims

ABSTRACT OF THE DISCLOSURE

A process for suspension polymerization of vinyl compounds in the presence of α-methylstyrene and a slightly water soluble inorganic salt or a water soluble high molecular weight compound.

Figure 1A:
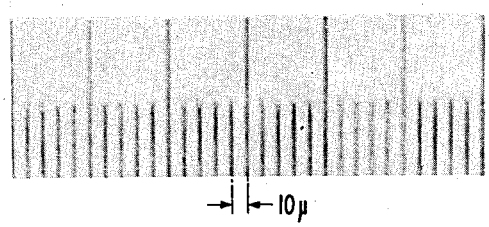

BACKGROUND OF THE INVENTION (1) Field of the invention

The present invention relates to a suspension polymerization process and more particularly to a process for preparing a uniform and transparent granular polymer having a substantially uniform shape by conducting the polymerization of a slightly water soluble and polymerizable monomer having a $CH_2=C<$ group (hereinafter, a vinyl group) in a state of suspension in water.

(2) Description of the prior art

In usual suspension polymerization processes a slightly water soluble and polymerizable monomer having a vinyl group is suspended in water by stirring. In this case, in order to obtain a granular polymer by conducting the polymerization reaction while stabilizing the suspended particles and maintain a good dispersion state, a dispersing agent such as a fine powder of a slightly water soluble inorganic salt or a water soluble high molecular weight material is employed.

However, by the use of only such fine powders of a slightly water soluble inorganic salt or a water soluble high molecular material, it is usually difficult to conduct pearl polymerization stably and hence the granularity of the polymer formed becomes uneven or a granular polymer having a uniform grain size cannot be obtained. Furthermore, although in such a case an improvement in stirring, etc., is utilized to obtain a granular polymer having fine grain size (that is, to obtain a granular polymer having an average grain size of about a few tenths or a few microns), a considerable amount of extremely fine particles of polymer having a grain size of about 0.1 micron is obtained by the emulsion polymerization. Also, amorphous coagulates of the fine particles (hereinafter, such extremely fine particles and the coagulates thereof are called "unnecessary emulsion polymerization product like particles") becomes larger. Therefore, it is very difficult to obtain polymer particles having a small grain size and a narrow grain distribution with a good yield by such a conventional manner.

SUMMARY OF THE INVENTION

Accordingly, the primary object of the present invention is to provide a suspension polymerization method for producing transparent granular polymer having a homogenous quality and a uniform shape.

Another object of this invention is to provide a suspension polymerization for producing fine particles of a polymer or a copolymer of a compound having a vinyl group.

The inventors have found that when conducting the suspension polymerization of a polymerizable monomer having a vinyl group using fine powders of an inorganic salt slightly soluble in water or a water soluble high molecular weight material as a dispersing agent, by adding a suitable amount of α-methylstyrene to the monomer having the vinyl group, the suspension polymerization is extremely stabilized and produces a transparent granular polymer having a very fine grain size and a narrow grain distribution easily. Moreover, intermingling of the unnecessary emulsion polymerization product like particles is greatly decreased.

An effective amount of the aforesaid α-methylstyrene is about 0.1–20 parts by weight per 100 parts by weight of the monomer composition but since the use of too large an amount of α-methylstyrene results in a prolonged polymerization induction period, it is preferable that the proportion of α-methylstyrene be 0.5–5 parts by weight per 100 parts by weight of the monomer composition.

The polymerizable compound or monomer having the vinyl group generally has a solubility of less than about 10% by weight, and can be selected from at least one of the following, styrene, acrylic esters, methacrylic esters, vinyl chloride, vinyl acetate, acrylonitrile and the like. The composition may contain such additives as a polymerization initiator, a polymerization regulator, a plasticizer, a coloring-preventing agent, a light fastness improving agent, etc., as well as a coloring dye and a pigment, if necessary.

The slightly water soluble inorganic salts used as a dispersing agent in this invention generally have a solubility of less than about 1% by weight and are, for example, basic magnesium carbonate, calcium phosphate, zinc oxide, and titanium oxide. It is preferred that they be used in the form of fine powders. The proportion of the inorganic salt is suitably about 0.5–10 parts by weight per 100 parts by weight of water.

Also, the water-soluble high molecular weight materials used in this invention as a dispersing agent, are, for example, gelatin, starch, dextrin, sulfonated polystyrene, a salt of the sulfonated polystyrene, and the saponification products of polyvinyl acetate, polyacrylic esters, polymethacrylic esters and the salts thereof. The effective proportion of the high molecular weight material is 0.01–20 parts by weight per 100 parts by weight of water.

Moreover, as usually practiced, the proportion of water to be used in the process of this invention is about 100–1000 parts by weight per 100 parts by weight of the monomer composition and a salt, such as sodium chloride or sodium nitrate, may be added to the aqueous phase if necessary.

In addition since the α-methylstyrene used in the present invention is a compound having a vinyl group, it is considered that the methylstyrene may be contained in the granular vinyl polymer prepared in the form of a co-polymer. Also, from the fact that α-methylstyrene does not provide a high molecular weight homopolymer by a radical polymerization as in the process of this invention and it is difficult to co-polymerize with other vinyl compounds or the proportion of the methylstyrene is small if the co-polymerization is possible, it is considered that the α-methylstyrene may be present in the granular vinyl polymer prepared as a form of a plasticizer without forming a co-polymer. In any case, the proportion of the α-methylstyrene is very small and hence it will not substantially affect the properties of the granular vinyl polymer prepared.

The following examples are offered as illustrative of the present invention.

EXAMPLE 1

Styrene—62 g.
Methyl methacrylate—238 g.
α-Methylstyrene—9 g.
Benzoyl peroxide—9 g.
Water—2.7 liters
Sulfonated polystyrene—5 g.

Figure 1A:
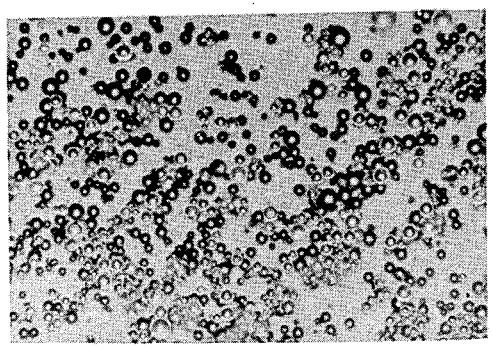
Figure 1B:
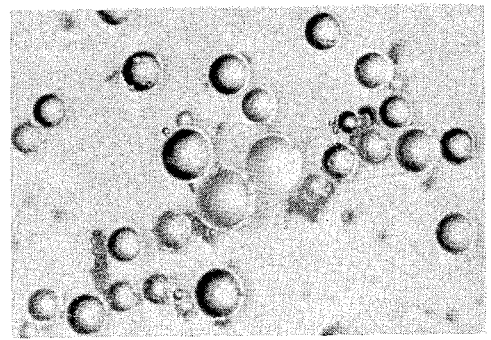

The above composition was charged into a 3 liter separable flask equipped with a two-blade stirrer and the system was reacted for about 8 hours at 70° C., while passing a nitrogen gas through the reaction system. A transparent granular polymer having a uniform fine grain size averaging about 10 microns was produced, the microscopic photograph of which is shown in FIG. 1–A in the accompanying drawings.

Also, the same procedure as above was repeated without using α-methylstyrene, but the polymer product contained a large proportion of the unnecessary emulsion polymerization product like particles, and was uneven. The microscopic photograph of this polymer is shown in FIG. 1–B.

EXAMPLE 2

Methyl methacrylate—300 g.
α-Methylstyrene—15 g.
Benzoyl peroxide—9 g.
Water—2.7 liters
Sulfonated polystyrene—5 g.

Figure 2A:
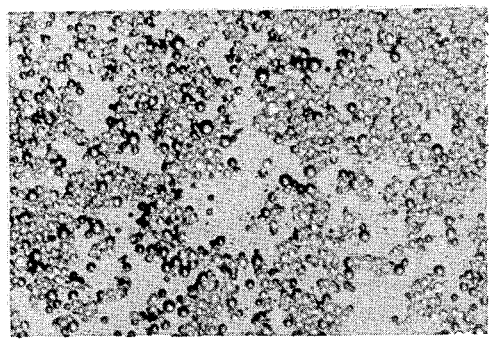
Figure 2B:
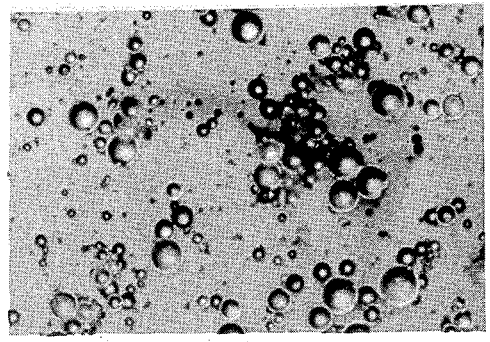

The suspension polymerization of Example 1 was repeated using the above composition. By this procedure, a uniform, fine granular polymer was obtained. The microscopic photograph of the polymer is shown in FIG. 2–A.

Also, for comparison, the above procedure was repeated without using α-methylstyrene but the polymer obtained was uneven and contained a large proportion of the unnecessary emulsion polymerization product like particles. The microscopic photograph of this product is shown in FIG. 2–B.

EXAMPLE 3

Methyl methacrylate—300 g.
α-Methylstyrene—15 g.
Benzoyl peroxide—9 g.
Water—2.7 liters
Zinc oxide—25 g.

Figure 3A:
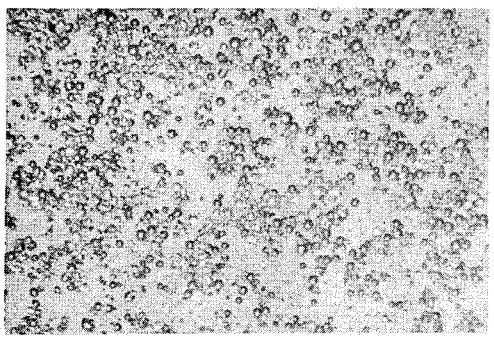
Figure 3B:
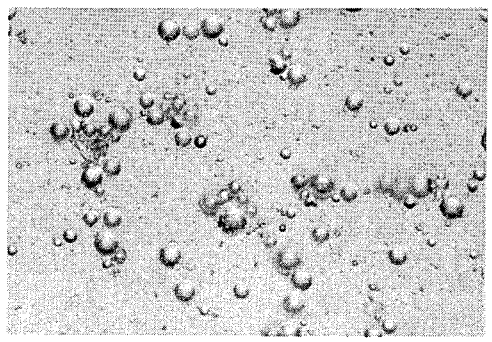

The same suspension polymerization procedure as Example 1 was repeated using the above composition. After the reaction was finished, the product was treated with a diluted aqueous solution of hydrochloric acid to produce a uniformly fine, transparent granular polymer, the microscopic photograph of which is shown in FIG. 3–A.

Also, for comparison, the above procedure was repeated using α-methylstyrene and the product was treated similarly with an aqueous hydrochloric acid solution to provide a granular polymer containing a large proportion of unnecessary emulsion polymerization product like particles and having uneven grain sizes. The microscopic photograph of this product is shown in FIG. 3–B.

EXAMPLE 4

Vinyl acetate—53 g.
Ethyl acrylate—247 g.
α-Methylstyrene—9 g.
Benzoyl peroxide—9 g.
Water—2.7 liters
Gelatin—25 g.

Figure 4A:
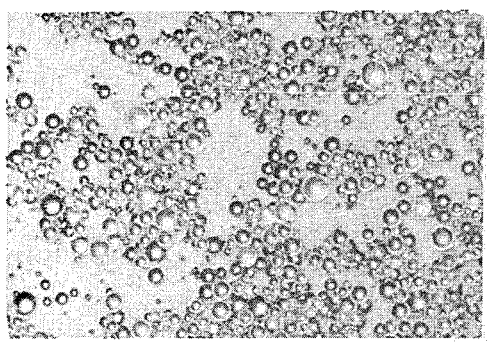
Figure 4B:
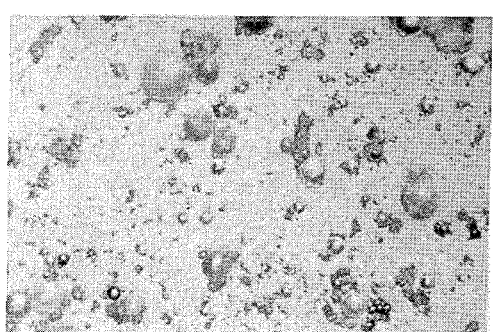

The same suspension polymerization procedure as in Example 1 was conducted using the above composition to provide uniformly fine granular co-polymer, the microscopic photograph of which is shown in FIG. 4–A.

Also, for comparison, the above procedure was repeated without using α-methylstyrene and the product contained uneven particles of polymer containing a large proportion of the unnecessary emulsion polymerization product like particles. The microscopic photograph of this polymer is shown in FIG. 4–B.

What is claimed is:

1. In a process for the suspension polymerization of a monomer composition comprising at least one polymerizable monomer having a vinyl group in from 100 to 1000 parts of water per 100 parts of vinyl monomer to obtain a vinyl polymer, said at least one polymerizable monomer having a vinyl group being selected from the group consisting of styrene, an acrylic ester, a methacrylic ester, vinyl chloride, vinyl acetate and acrylonitrile, the improvement which comprises carrying out the suspension polymerization in the presence of 0.5 to 5 parts of α-methyl styrene per 100 parts of vinyl monomer, and a member selected from the group consisting of an inorganic salt and a water soluble high molecular weight compound as are used in the suspension polymerization art as dispersing agents, said inorganic salt having a solubility of less than about 1% by weight and being present in an amount of from 0.5 to 10 parts by weight per 100 parts by weight of water, and said water soluble high molecular weight compound being present in an amount of from 0.1 to 20 parts by weight per 100 parts of water, and α-methyl styrene not substantially affecting the chemical properties of the vinyl polymer but providing a homogeneous, inherently transparent vinyl polymer of a uniform granular size.

2. The process as claimed in claim 1 wherein said inorganic salt is selected from the group consisting of basic magnesium carbonate, calcium phosphate, zinc oxide, and titanium oxide.

3. The process as claimed in claim 1 wherein said inorganic salt is used in the form of a fine powder.

4. The process as claimed in claim 1 wherein said water soluble high molecular weight compound is selected from the group consisting of gelatin, starch, dextrin, sulfonated polystyrene, a saponification product and a salt of such a saponification product of a member selected from the class consisting of polyvinyl acetate, a polyacrylic ester and a polymethacrylic ester.

5. The process as claimed in claim 1 wherein the monomer has a solubility of less than 10% by weight.

6. In a process for the suspension polymerization of a monomer composition comprising at least one polymerizable compound having a vinyl group in from 100 to 1000 parts of water per 100 parts of vinyl monomer to obtain a vinyl polymer, said polymerizable compound having a solubility of less than 10% by weight and being selected from the group consisting of styrene, acrylic esters, methacrylic esters, vinyl chloride, vinyl acetate and acrylonitrile, the improvement which comprises carrying out the suspension polymerization in the presence of 0.5 to 5 parts of α-methyl styrene per 100 parts of vinyl monomer, and a member selected from the group consisting of from 0.5 to 10 parts by weight per 100 parts by weight of water an inorganic compound from the class consisting of basic magnesium carbonate, calcium phosphate, zinc oxide and titanium oxide; and from 0.1 to 20 parts by weight per 100 parts by weight of water of a water soluble high molecular weight compound selected from the class consisting of gelatin, starch, dextrin, sulfonated polystyrene, a saponification product and a salt of such a saponification product of a member selected from the class consisting of polyvinyl acetate, a polyacrylic ester and a polymethacrylic ester, as are used in the suspension polymerization art as dispersing aids, said α-methyl styrene not substantially affecting the chemical properties of the vinyl polymer but providing a homogeneous, inherently transparent vinyl polymer of a uniform granular size.

7. The process of claim 1 wherein said vinyl polymer has a size of about 10µ.

8. The process of claim 6 wherein said vinyl polymer has a size of about 10µ.

References Cited

UNITED STATES PATENTS

| | | | |
|---|---|---|---|
| 2,388,602 | 11/1945 | Kiar | 260—92.8 W |
| 2,836,585 | 5/1958 | Hill | 260—85.5 N |
| 2,857,367 | 10/1958 | Kearney | 260—88.7 |
| 3,068,192 | 12/1962 | White | 260—85.5 M |
| 3,491,071 | 1/1970 | Lanzo | 260—85.5 HC |
| 3,493,551 | 2/1970 | Aoishi et al. | 260—85.5 |

HARRY WONG, JR., Primary Examiner

U.S. Cl. X.R.

260—85.5, 85.7, 86.1, 87.5, 88.1, 89.1, 89.5, 92.8, 93.5